C. R. FOUNTAIN.
AUTOMATIC TRANSMISSION GEARING.
APPLICATION FILED DEC. 29, 1916.
1,239,379.
Patented Sept. 4, 1917.
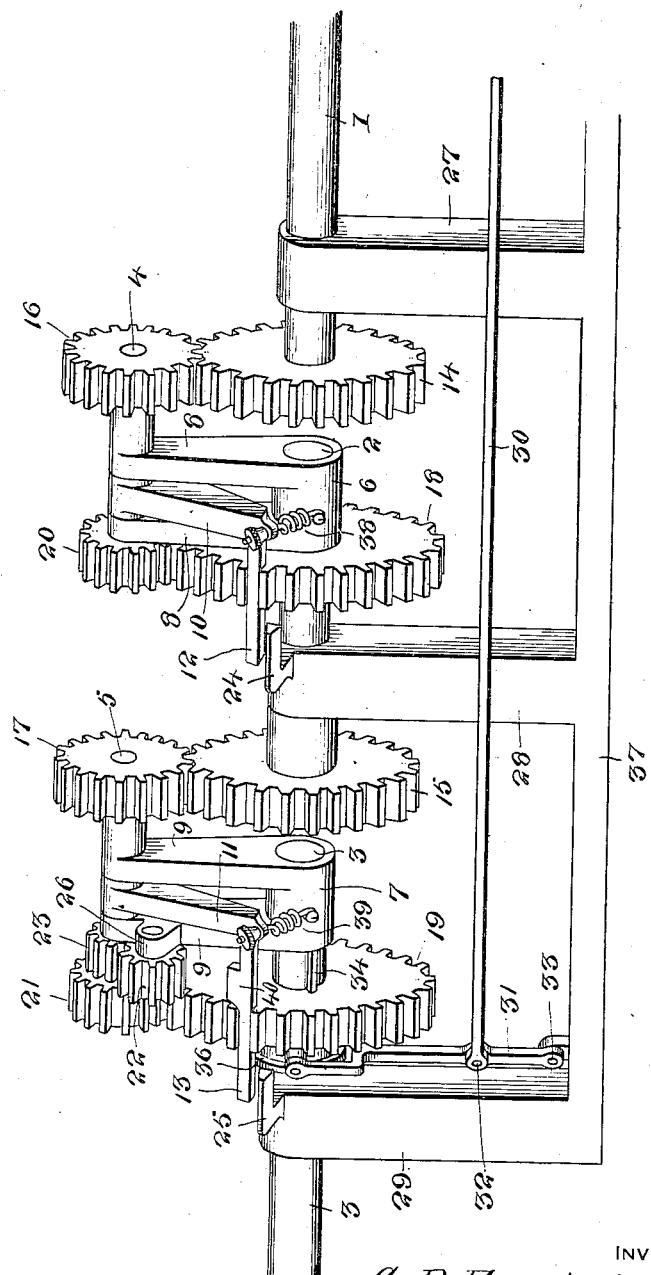
WITNESSES
INVENTOR
C. R. Fountain
BY Victor J. Evans
ATTORNEY

UNITED STATES PATENT OFFICE.

CLAUDE R. FOUNTAIN, OF ATHENS, GEORGIA.

AUTOMATIC TRANSMISSION-GEARING.

1,239,379.          Specification of Letters Patent.        Patented Sept. 4, 1917.

Application filed December 29, 1916. Serial No. 139,622.

*To all whom it may concern:*

Be it known that I, CLAUDE R. FOUNTAIN, a citizen of the United States, residing at Athens, in the county of Clarke and State of Georgia, have invented new and useful Improvements in Automatic Transmission-Gearings, of which the following is a specification.

This invention relates to transmission gearing and particularly to means whereby the shiftable gears of the mechanism are automatically shifted in accordance with the resisting torque of the load shaft, which in an auto runs from the transmission gearing to the differential gearing of the driving axle.

The object of the present invention is to provide means whereby the necessary members of the transmission gearing are automatically shifted from a lower to a higher speed or from a higher to a lower speed without any attention on the part of the operator of the machine.

In the operation of the mechanism the parts are ordinarily in position for high speed, but whenever the torque reaches a predetermined value the gearing automatically shifts to a lower (intermediate) speed. If the torque becomes still greater the gearing automatically shifts to a still lower (low) speed. Any number of gear shifts may thus be made automatically. If the torque decreases below a certain predetermined point the gearing automatically shifts back to a higher speed. Provision is also made whereby the direction of rotation of the load shaft may be reversed.

The broad object of this invention is to eliminate the shifting of gears by hand and to substitute therefor means whereby the gears are shifted automatically in accordance with the power applied to the load shaft.

With the above and other objects in view, the invention consists in the novel construction, combination and arrangement of parts as herein described, illustrated and claimed.

The accompanying is a perspective view of the improved transmission gearing.

Referring to the drawing, 1 designates the driving shaft, 2 an intermediate shaft, and 3 the driven or load shaft. The driving shaft 1 in automobile practice will constitute either the engine shaft or an extension thereof from the clutch, while the driven shaft 3 will constitute what is known as the drive shaft or load shaft which extends from the transmission gearing back to the differential gearing on the rear axle which constitutes the driving axle of the machine.

In carrying out the present invention I provide on the driving shaft 1, a gear 14, fast thereon. On the intermediate shaft 2, I provide gears 15 and 18, fast thereon, one on each side of a support 28 for the shaft, which allows said shaft to rotate therein. On the shaft 2 is also provided a collar 6 with countershaft supporting arms 8 fast thereto. The collar 6 is free to move about the shaft 2. The arms 8 support a counter shaft 4, which is free to rotate therein. The shaft 4 has fast thereon the gears 16 and 20. The gears 14 and 18 are always in mesh respectively with the gears 16 and 20. The shaft 4 also has loose thereon an arm 10 having an extension arm 12 and also having attached thereto one end of a spring 38, the other end of which is attached to the collar 6. The support 28 has at least one arm or stop 24 thereon.

The load shaft 3 is provided with a gear 19 free thereon to slide longitudinally thereon, being prevented by a key 34 from rotating independently thereof. The load shaft 3 is also provided with a collar 7 having countershaft supporting arms 9. The collar 7 is free to move about the shaft 3. The arms 9 support a countershaft 5, which is free to rotate therein. The shaft 5 has fast thereon gears 17, 21 and 23. One arm 9 has an extension arm 26 which supports a reversing gear wheel 22. The gear 15 is always in mesh with the gear 17. On all forward speeds the gear 19 is always in mesh with the gear 21 and on reverse it is in mesh with gear 22 which is always in mesh with gear 23. The shaft 5 also has loose thereon an arm 11 having an extension arm 13 and also having attached thereto one end of a spring 39, the other end of which is attached to the collar 7. A support 29 for the shaft 3 has at least one arm or stop 25 thereon. The gear 19 has attached thereto on the outside the grooved collar 36. A base or frame 37 has attached thereto the supports 27, 28 and 29, and also has a lever 31 pivoted thereto at 33. The other end of the lever 31 fits into a groove in the collar 36. One end of a rod 30 is pivoted upon the lever 31 at the point 32 and the other end is joined to the "reversing lever" (not shown). On the arm 13 is a flat projection 40.

In view of the foregoing description, taken in connection with the accompanying drawing, the operation of the device will now be understood to be as follows:

Under normal conditions the arms 12 and 13, are held by the springs 38 and 39, between the teeth of the gears 18 and 19 respectively, thus preventing any relative motion between the shafts 1, 2 and 3. That is the three shafts 1, 2 and 3 rotate with the same velocity. The device will then be said to be operating in high speed. When the resisting torque of the shaft 3 reaches a certain point determined by the tension on the spring 39 the arm 13, is forced outwardly from between the teeth of the gear 19. This allows the shaft 5 with its gears 17, 21 and 22 and the gear 23, to rotate counterclockwise about the gears 15 and 19. This motion however will continue only until the arm 13 strikes the stop 25, which holds the arm 13 free from the gear 19, as long as the resisting torque is greater than a resistance determined by the tension on the spring 39, and the nature of the contact surfaces of the stop 25 and the arm 13. As long as the arm 13 is held free of the gear 19 the clockwise motion of the gear 15 causes the gear 17 to rotate counterclockwise. This causes the gear 21 to rotate counterclockwise which imparts a clockwise motion to the gear 19, but its velocity is less than the velocity of the gear 15. Under these conditions the device will be operating in "intermediate speed". Likewise if the resisting torque on the shaft 2 reaches a point determined by the tension on the spring 38, the arm 12 is forced outwardly from between the teeth of the gear 18. This allows the shaft 4, with its gears 16 and 20, to rotate counterclockwise about the gears 14 and 18. This motion will continue only until the arm 12 strikes the stop 24 which holds the arm 12 free from the gear 18, as long as the resisting torque is greater than a predetermined amount. As long as the arm 12 is held free from the gear 18 the clockwise motion of the gear 14 will impart a counterclockwise motion to the gears 16 and 20. This motion of the gear 20 will impart a clockwise motion to the gear 18, but the gear 18, will move at a slower speed than the gear 14. Under these conditions the shaft 2 will be rotating slower than shaft 1, and shaft 3 will be rotating slower than the shaft 2. The device will then be said to be operating in low speed. Any number of such gear units may thus be arranged in series so that any number of gear shifts may thus be automatically arranged for.

Whenever the resisting torques on the respective shafts become less than the predetermined values, the springs 38 and 39 pull the arms 12 and 13, from the stops 24 and 25 and engage them with the gears 18 and 19, respectively. This locks the countershaft 4, to the shafts 1 and 2, and then the countershaft 5, to the shafts 3 and 2, so that the three shafts 1, 2 and 3, again rotate together, the countershafts 4 and 5 swinging around the shafts 1, 2 and 3, at the same speed of rotation as the shafts 1, 2 and 3. The device is now operating in what is known as high speed.

In order to reverse the direction of rotation of the shaft 3 with relation to the shafts 1 and 2, the gear 19 is moved on the shaft 3 by means of the rod 30 acting on the lever 31, to pull the gear 19 into mesh with the gear 22. This motion of the gear 19 brings it under the flat projection 40 of the arm 13 thus raising the arm 13 free from the teeth of the gear 19 and causing it to catch on the stop 25 regardless of the torque applied. This enables the gear 15 to transmit counterclockwise rotation to the gears 17 and 23. The gear 23 transmits clockwise rotation to gear 22 which thus transmits counterclockwise rotation to the gear 19 and the shaft 3.

From the foregoing description, taken in connection with the accompanying drawing, the construction and manner of operation of the gearing will be readily apparent and a more extended explanation has, therefore, been omitted.

I claim:

1. Transmission gearing, embodying in combination a main driving shaft, a main driven shaft in line therewith, gears fast on the driving and driven shafts, a countershaft in spaced relation to the driving and driven shafts, a support for the countershaft loose on one of said main shafts, gears fast on said countershaft, means for locking the gears against relative rotation to cause said driving and driven shafts to rotate at the same speed, and also automatically unlocking said gears to permit them to rotate when the torque of said shafts reaches a predetermined value, and means coöperating with the first named means for stopping sidewise motion of the countershaft when the said gears are unlocked.

2. Transmission gearing, embodying in combination a main driving shaft, a main driven shaft in line therewith, gears fast on the driving and driven shafts, a countershaft in spaced relation to the driving and driven shafts, a support for the countershaft loose on one of said main shafts, gears fast on said countershaft, means for locking the gears against relative rotation to cause said driving and driven shafts to rotate at the same speed, and also automatically unlocking said gears to permit them to rotate when the torque of said shafts reaches a predetermined value, means coöperating with the first named means for stopping sidewise motion of the countershaft when the said gears are unlocked, means for reversing the relative direction of motion of the driving and driven shafts, and means for preventing the locking of the driving and driven shafts when the reversing mechanism is in position for operation.

3. Transmission gearing embodying in combination, a main driving shaft, a main driven shaft, a main intermediate shaft in line with the driving and driven shafts, gears on the above mentioned main line shafts, countershafts in spaced relation to said main line shafts, gears fast on the countershafts loose on the main line shafts, gears fast on the countershafts, means for locking the gears controlling any two main line shafts against relative rotation to cause said two shafts to rotate at the same speed, and also automatically unlocking the gears controlling any two adjacent main line shafts whenever the torque between said two main line shafts reaches a certain value, and means coöperating with the first named means for stopping sidewise motion of any countershaft when the said gears are unlocked.

4. Transmission gearing embodying in combination, a main driving shaft, a main driven shaft, a main intermediate shaft in line with the driving and driven shafts, gears on the above mentioned main line shafts, countershafts in spaced relation to said main line shafts, gears fast on the countershafts loose on the main line shafts, gears fast on the countershafts, means for locking the gears controlling any two main line shafts against relative rotation to cause said two shafts to rotate at the same speed, and also automatically unlocking the gears controlling any two adjacent main line shafts whenever the torque between said two main line shafts reaches a certain value, means coöperating with the first named means for stopping sidewise motion of any countershaft when the said gears are unlocked, means for reversing the relative direction of rotation of the main driven shaft and its adjacent main line shaft, and means for preventing the locking of the main driven shaft with its adjacent main line shaft when the reversing mechanism is in position for operation.

In testimony whereof I affix my signature.

CLAUDE R. FOUNTAIN.